Figure 1:
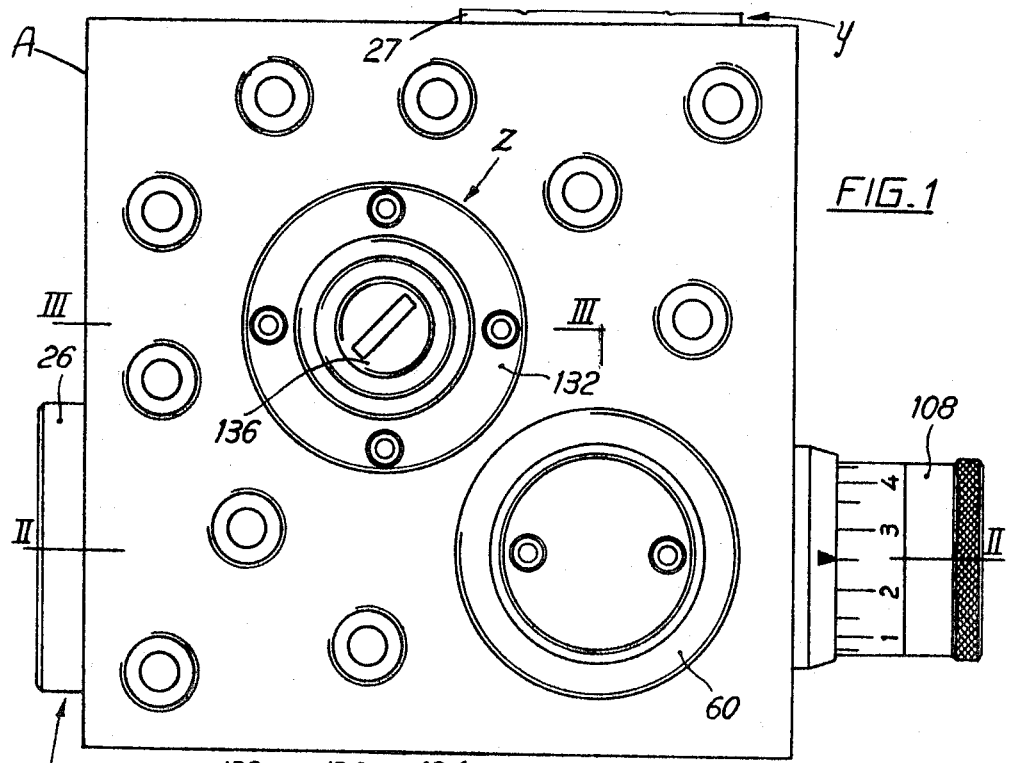

United States Patent

[11] 3,588,032

| [72] | Inventor | Angelo Girola<br>P. O. Box 341, Busto Arsizio, Varese, Italy |
|---|---|---|
| [21] | Appl. No. | 758,840 |
| [22] | Filed | Sept. 10, 1968 |
| [45] | Patented | June 28, 1971 |
| [32] | Priority | Sept. 16, 1967 |
| [33] | | Italy |
| [31] | | 20543 A/67 |

[54] HYDRAULIC MASTER
9 Claims, 5 Drawing Figs.

| [52] | U.S. Cl. | 251/3,<br>137/625.69 |
|---|---|---|
| [51] | Int. Cl. | B23q 35/16 |
| [50] | Field of Search | 251/3;<br>60/97 (T); 90/62 |

[56] References Cited
UNITED STATES PATENTS

| 2,239,625 | 4/1941 | Roehm et al. | 251/3X |
|---|---|---|---|
| 2,872,148 | 2/1959 | Humes | 251/3 |
| 2,909,357 | 10/1959 | Rosebrook | 251/3 |
| 3,084,899 | 4/1963 | Dever et al. | 251/3 |
| 3,390,859 | 7/1968 | Rosebrook | 251/3 |
| 3,477,685 | 11/1969 | Ring | 251/3 |

*Primary Examiner*—M. Cary Nelson
*Assistant Examiner*—Richard Gerard
*Attorney*—Stowell and Stowell ABSTRACT: A hydraulic tracer which includes a feeler engageable against the profile of the pattern and acting on two or three distributors perpendicularly arranged to each other, the movable equipment of said distributors being driven by the above-mentioned feeler through a flexible rod.

INVENTOR
ANGELO GIROLA

BY Stowell & Stowell
ATTORNEYS

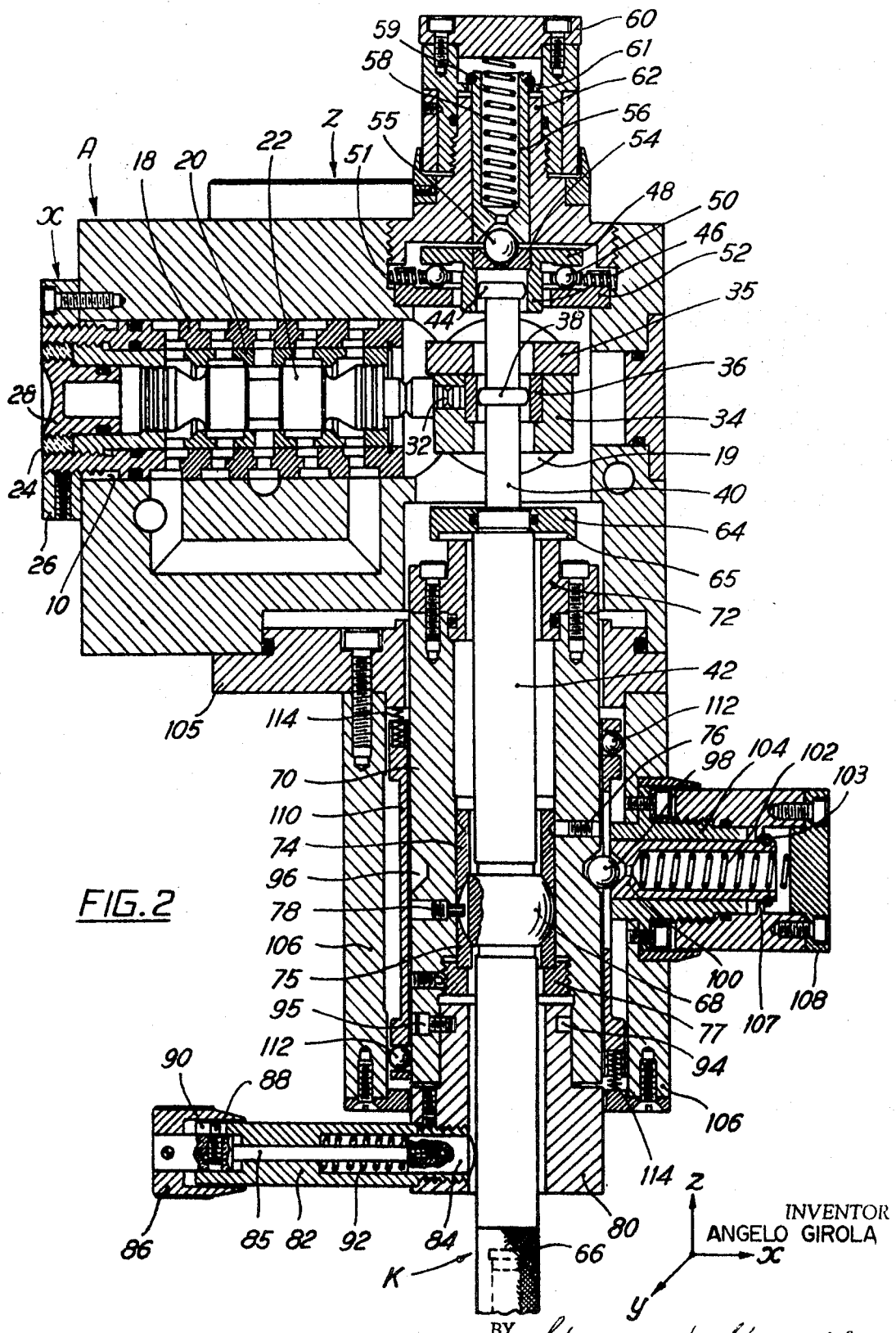

INVENTOR
ANGELO GIROLA

BY Stowell & Stowell
ATTORNEYS

HYDRAULIC MASTER

The present invention concerns a hydraulic tracer, particularly, but not exclusively, for milling machines, the tracer point or stylus of which cooperates manually with a template or pattern for controlling the relative displacement in at least two directions between the tool and the workpiece.

Presently, in the use of tracer devices in milling machines and the like, the stylus of the master or tracer follows the contour of the template, which, together with the workpiece, is moved with respect to said stylus by means of a driving or progressive motion providing displacement of the tool along two or three orthogonal axes.

The invention relates to a hydraulic master or tracer by means of which the displacement of the workpiece with respect to the tool or vice versa is manually and easily controlled along two or even three directions, orthogonal to each other, with minimum effort and without vibrations, even in case the hydraulic pressures present exceed higher values than actually required for attaining the best working conditions, such as the double deflection of the stylus for obtaining slow and rapid displacements.

Another object of this invention is to provide a master, in which the displacements between the tool and the workpiece along two or three of said directions are subordinated or dependent with respect to each other.

A further object of the invention is to provide kinematic couplings between the stylus and the movable equipment of the distributors without clearances or parasitic movements due to displacement of the workpiece.

Moreover, in the master according to this invention, the amount of displacements undergone by the stylus is substantially equal to that undergone by the two or three distributors provided by the master, and which controls the operation of the motors displacing respectively the workpiece and the template with respect to the tool and the stylus.

The master according to this invention is provided with at least two distributor assemblies, orthogonal to each other and moved by the stylus, consisting of a rod connected by means of a joint to the body of the master and, is characterized in that said rod is connected at its end opposite to the stylus with means which actuate in the two directions the pistons of the distributor assemblies of the master and in that it has adjustable stopping means controlling the amplitude of the displacements imparted to said stylus rod.

The stylus rod is operatively connected with the pistons of at least a part of the distributor assemblies by means of a small and at least partially flexible rod or by means of brackets integral with the pistons of said assemblies, between the arms of which is fitted, with limited clearance, a fillister head integral with the stylus rod.

According to this invention, the cylinder of at least part of the distributor assemblies provides for gauges holes with the openings of which cooperates the periphery of the corresponding piston; thus providing a communication between the chambers of the considered cylinder and the pressure source and/or the discharge, said communication being progressively increased.

Figure 3:
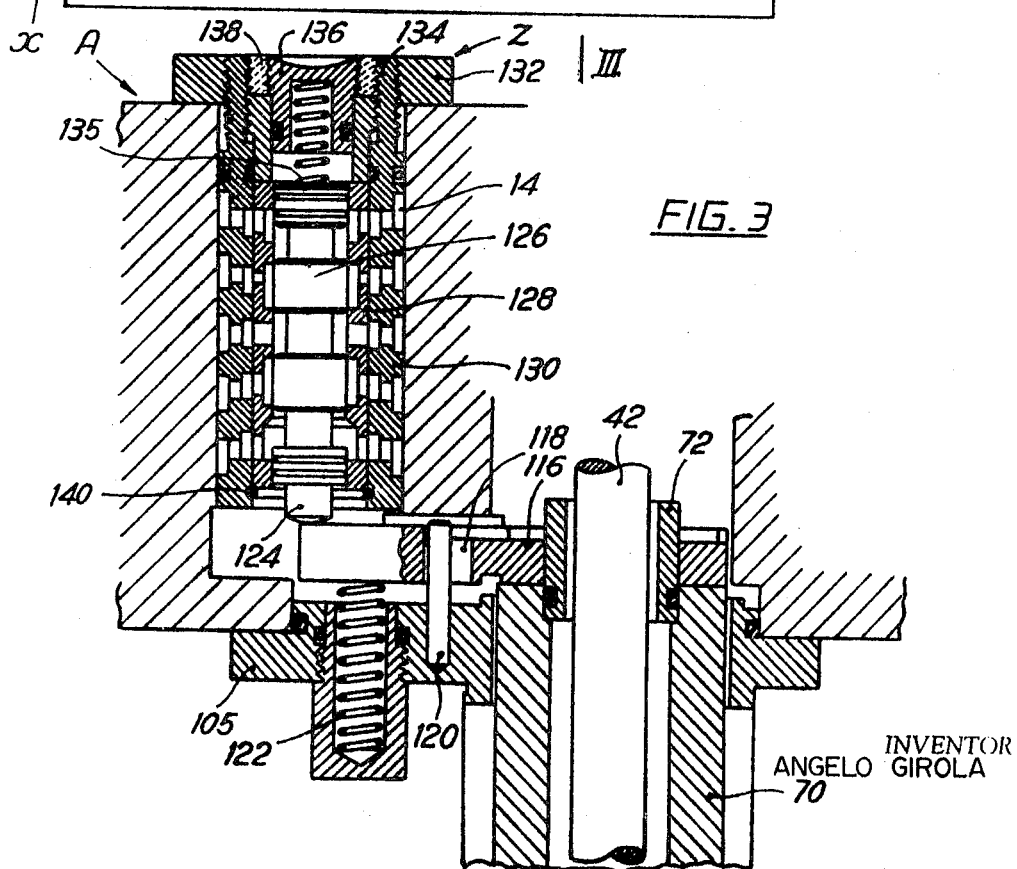
Figure 4:
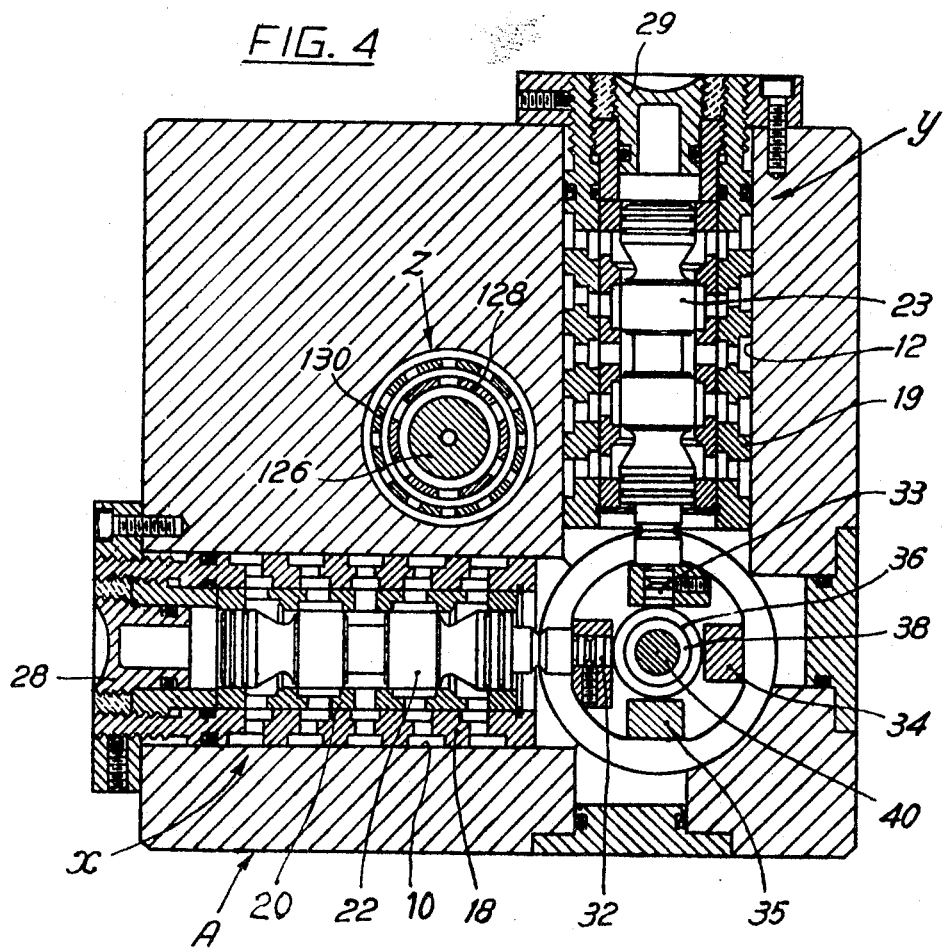
Figure 5:
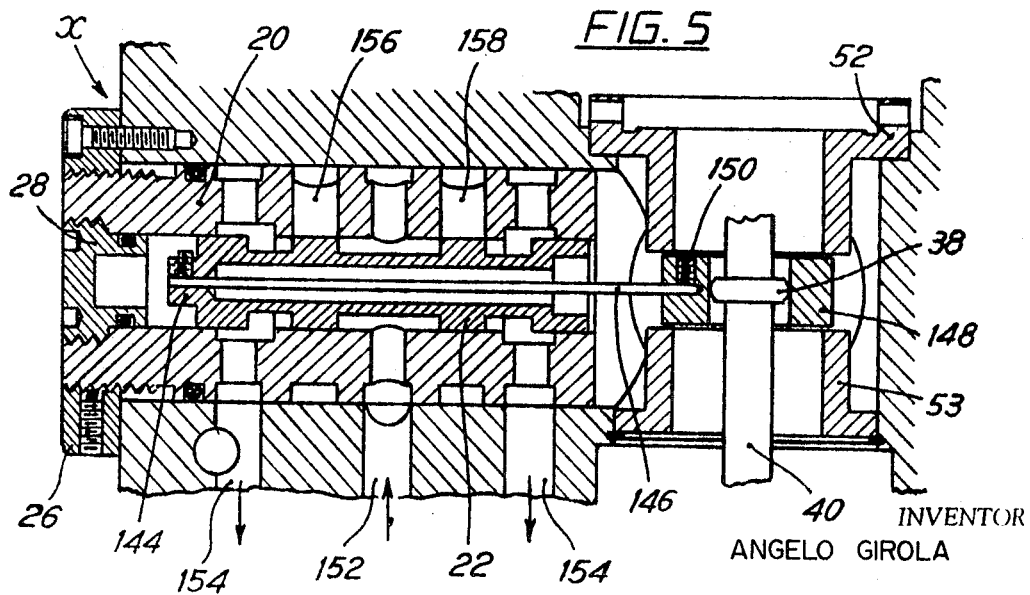

The invention will now be explained in the following description in conjunction with the attached drawings, only given as example, illustrating a tridirectional master, in which:

FIG. 1 shows a top view of the master;
FIG. 2 shows a vertical section along the axis II–II of FIG. 1;
FIG. 3 shows a partial section along the axis III–III of FIG. 1;
FIG. 4 shows a partial section along the axis IV–IV of FIG. 2;
FIG. 5 shows a vertical section similar to the one of FIG. 2, representing a modification of the operative connection between the stylus and the distributor assemblies.

The illustrated master consists of a prismatic body A, housing distributor assemblies X, Y and Z, arranged in such a way that their axes are orthogonal to each other.

For practical reasons, however assembly Z is arranged in body A in such a way that its axis intersects the bisector of the axes of assemblies X and Y.

Body A together with the parts which will be described is secured by a suitable support to a machine tool, for example to the head of a milling machine, so that the stylus of the master cooperates with the template or pattern (not shown). Body A is provided with pipe fittings communicating by means of the chambers of distributors X, Y and Z with a pressure source or the discharge of at least one of three hydraulic motors, which actuate in a conventional manner, a table bearing the workpiece or the tool itself during the working process.

The three distributor assemblies X, Y, and Z are arranged in corresponding housing, 10, 12, (FIG. 4) and 14 (FIG. 3) provided in body A. The two distributors X and Y are the same construction and only one of them will be described; moreover the corresponding members of the distributor Y will be indicated with odd numbers immediately following the X numerals.

Distributor X (and, therefore, distributor Y) consists of a tubular element 18 (19) in the inside of which are inserted, in succession, a set of rings 20 (21) forming a cylinder in the interior of which slides a fluidtight distributor piston 22 (23). Such pistons are also known as spools.

Tubular element 18 and the set rings 20 terminate at their protruding ends with threaded appendices engaging ring nuts 26 and 24. The latter secure the set of rings 20 to the tubular element 18, whereas ring nut 24 allows parts 18—20 to move axially, thus controlling the position of their peripheral openings with respect to the slots provided by distributor piston 22.

A threaded plug 28 axially couples tubular element 18 together with the group of rings 20.

Considering FIGS. 1 thru 4, distributor piston 22 terminates in a pivot 32 integral with one of the arms of a bracket 34, which cooperates, through a ring 36, with a fillister head 38 integral in turn with appendix 40 of rod 42, the axis of which is orthogonal to the axes of distributor pistons 22 and 23.

A similar arrangement is provided for distributor assembly Y located horizontally and at an angle of 90° with respect to the above-described assembly X. More specifically, the end 33 of distributor piston 23 is connected to a bracket 35, the arms of which cooperate with fillister head 38 in a position displaced at an angle of 90° with respect to the arms of bracket 34.

The extension 40 terminates at its upper end with another fillister head 44, cooperating with the walls of a bushing 46 terminating at its upper end with a flange 48 forming a rolling table for balls 50 retained in their lower part by means of a ring 52 integral with prismatic body A, which, together with bushing 46, provide a stop for the maximum amplitude of oscillation imparted by the operator to stylus rod 42. A spring-supported housing 51 keeps the set of balls 50 centered, to ensure a vertical position to stylus rod 42. A socket 54 for a ball 55 is located at the top of bushing 46 and at its upper end said ball cooperates with a suitable clearance with a complementary socket presented by one of the ends of sleeve 56 and which is subject to the action of a spring 58, which keeps said sleeve engaged against a stop consisting of a resilient ring 59 and of a head 61. This latter is integral with a threaded button 60 retaining the other end of spring 58 and which is screwed on a tubular element 62 integral with prismatic body A; these parts are provided with graduation and reference index to show the reciprocal positions of the sockets and ball 55. The operation of button 60 axially displaces sleeve 56 thus varying said clearance and, consequently, the amplitude of deflection of stylus rod 42 during the copying operation. This kind of arrangement permits the imparting of two types of deflections to rod 42, the first type concerns the copying operation and the maximum deflection is adjustable and determined by the axial position of sleeve 56, whilst the second type is effected by pushing rod 42 over the angular position established by sleeve 56 in opposition to the action of spring 58. In this latter case, the displacement of the workpiece with respect to the tool occurs with increased speed.

A disc or plate 64 with annular head 65 is secured between the adjoining extremities of the terminal end 40 and the rod 42, said head forming a protection for the lubricant. The stylus rod 42 is provided with a suitable length and terminates at its other end with a seat 66 retaining stylus K, which can thus be replaced if necessary.

The rod 42 is provided in its middle part, with a spherical head 68, which, in the case of tridimensional masters, as illustrated, is introduced with very limited clearance into a tubular guiding element 70, which terminates, at its upper end with a head 72. In the case of a two-dimensional master, stylus rod 42, not displacing itself axially, is held directly by body A of the master.

The positioning of spherical head 68 in the inner part of tubular element 70 is provided by two bushings 74 and 75, which are retained with very limited clearance, by a blocking screw 76 and by a ring 77, respectively.

The spherical head 68 is provided, along one of its meridians, with a slot which engages the end of a screw 78 held by the tubular guiding element 70, which hinders the rotation of rod 42 and ensures the torsional connection between these parts, whereas spherical head 68 may be angularly shifted along the axis of the tube-shaped element.

A collar 80 is introduced in the lower opening of tubular guiding element 70 and its protruding end is provided with a hole to retain a radially set drilled arm 82 and which guides a spring-supported head 84 integral with a rod 85 ending with a knurled nut 86. A pin 88 is radially integral with rod 85 and may be engaged in one or the other of two notches 90 provided by the edge of drilled arm 82, forming an angle of 90° and having different depth.

The action of spring 92 is exercised on head 84 to impart to the latter and to rod 42 a counterclockwise oscillation around the spherical head 68. For neutralizing the action of spring 92 on head 84, button 86 is rotated around an angle of 90° to bring pin 88 into notch 90 of less depth, to disengage head 84 from rod 42. The collar 80 with arm 82 can be orientated in any desired direction on a plane parallel to the axes X and Y as said collar 80 is provided with an annular groove 94, and in which the end of a screw 95 is engaged, fixed to tubular guiding element 70. It is thus possible to impart to rod 42, by means of head 84, a tilt orientated in the desired direction with reference to what will be described.

The tubular guiding element 70 is held to body A of the master in such a way as to be able to slide along its axis. For this purpose said tubular guiding element provides about half way of its length, a peripheral groove 96 with convergent walls in which a ball 98 is positioned and retained by a socket 100. Said socket 100 retains one of the ends of a spring 102 and slides within a guiding bushing 104 radially integral with a tubular element 106 tightened by means of a flange 105 to body A. Guide bushing 104 presents a screw thread for a control button 108, which retains the other end of spring 102 to keep engaged a stop 103 integral with socket 100, against a head 107 integral with said button 108. Thus it is possible to regulate the axial clearance of the tubular guiding element 70 and, consequently, of the stylus rod 42, similarly to what has been said for button 60. More axial displacements of different width may be imparted to tubular guiding element 70 the first of which (adjustable by means of button 108) are determined by the clearance existing between grooves 96 and socket 100, whereas the second are effected by axially displacing said tubular guiding element 70 in opposition to the action of spring 102.

To ensure sliding practically without friction of tubular guiding element 70 together with the corresponding parts inside tubular element 106, a housing 110 is provided between these two parts, said housing being provided at its ends with radial seats to house balls 112 which cooperate with the annular surfaces of tubular guiding element 70 and of tubular element 106. Springs 114 are housed in axial seats provided at the ends of housing 110, to keep the latter equally spaced with respect to the end of tubular element 106.

The third distributor assembly Z is similar to the first two and is housed in body A of the master, as shown in FIG. 4, in such a way as to be located between said distributors X and Y and with its axis intersecting the bisector of the axes relating to said distributors.

Head 72, integral with tubular guiding element 70, presents laterally a radial arm 116 (see FIG. 3) provided in a suitable position with a slot 118 for a guiding pin 120 introduced in the flange 105, which is integral with body A of the master. On the lower face of arm 116 acts a spring 122 retained by the flange 105, the action of which spring engages the other face of said arm against the end 124 of piston or spool 126 of the third distributor assembly Z. This piston is similar to the previously described set of rings provided with radial openings; this set of rings is retained by means of tubular element 130, which is slidingly inserted in the housing 14 provided in body A.

The tubular element 130 and, therefore, also cylinder 128 are axially movable by means of a threaded ring 132, engaged with the threaded end 134 of said tubular element. A button 136 is held by a counter nut 138 urging the set of rings 128 against a ring 140 of the tubular element 130. Said button also retains a spring 135, which urges the piston 126 against the end of arm 116.

The master operates as follows:

Keep in mind that during normal working conditions pin 88 engages notch 90 at less depth so that head 84 moves away from rod 42, which may thus take the vertical position, in which its axis exactly coincides with that of guiding element 70 and this latter is kept in the position shown in FIG. 2 by a ball 98, which engages both sloping sides of groove 96. In this position pistons 22, 23 and 126 of distributor assemblies X, Y and Z, all prevent the passage of the fluid under pressure to the three hydraulic motors, which are operatively connected with the workpiece carriers and with the mandrel of the machine tool under consideration as, for example, a milling machine. In this case, the contour which the stylus cooperates with, is held by the workpiece carrier, whereas the master is constrained to the mandrel for the tool.

For guiding the tool along the working contour the operator acts on stylus K engaging it with the template and displacing it along at least two of the three directions X, Y and Z. This manual operation can be done easily due to the clearance established between socket 54 and pivot 56 as well as between groove 96 and socket 100 thus sloping rod 42 for a certain angle and, eventually, displacing said rod along its axis.

Head 38 displaces at least one of pistons 22 and 23, whereas the possible axial displacement of rod 42 activates piston 126. Such piston movements allow the feeding of one or more of the previously considered hydraulic motors, which move the tool along at least one of the axes X, Y and Z with a certain preset speed with respect to the workpiece. By effecting this displacement stylus K returns in the originally considered rest position in which the three pistons 22, 23 and 126 close the passage between the pressure source and the hydraulic motors. However, the continual manual action executed by the operator on stylus K brings the latter in tracing positions immediately following the previous ones, and this keeps one of the three pistons displaced to effect the practically continuous feed of the workpiece with respect to the tool.

When the operator wishes to displace the tool with respect to the workpiece with a speed greater than that already considered, and along anyone of the three directions X, Y and Z, he moves stylus rod 42 in the desired direction in opposition to the action of springs 58 (for X and Y) and/or 102 (for Z) thus imparting maximal displacements to at least one of pistons 22, 23 and 126.

When the template presents a rectilinear profile with any orientation the operator rotates collar 80 in order to impart to head 84 a displacement such that its axis will slope with an angle of 45° with respect to the considered rectilinear profile. Successively, the operator acts on button 86 to engage head 84 with rod 42. In this case the master behaves as a normal master. The already considered possibility of regulating the axial positions of tubular elements or cylinders 18, 19 and 128 with respect to the corresponding pistons 22, 23 and 126 of assemblies X, Y and Z together with the adjustment of the clearances between socket 54 and pivot 56 and between groove 96 and socket 100 makes it possible to obtain different ratios between the inlet speed and the outlet speed of the tool with respect to the workpiece. It is possible, for instance, to obtain, with a certain determined inlet speed of the tool into the workpiece, an outlet speed which is increased with respect to the inlet speed.

Considering now FIG. 5, this shows in axial cross section, a modification of an embodiment of either of the three distributor assemblies X, Y and Z; in this specific case said FIG. is a longitudinal section of group X of the master; the parts which are identical to those of FIGS. 1 to 4 have the same reference numbers.

This modification considers an advantageous solution of the operative connection between piston 22 of the distributor assembly X and the appendix 40 of stylus rod 42 and the possibility of providing passages between the chambers and the pipes for supply and discharge of the considered group, passages which are progressively increasable according to the displacement of the stylus.

Obviously the above teachings can be applied to the order distributor assemblies of the master.

Piston 22 is bored axially and terminates at one of its ends with a hub 144 to which one of the ends of a flexible rod 146 is anchored, said rod being of suitable material, for example of steel, and of adequate dimensions convenient for the aims which must be reached.

The other end of small rod 146 is slid into a hole radially provided in ring 148 and there it is anchored by a screw 150 and, in an analogous way, small rod 146 pertinent to piston 22 of group Y is fixed to said ring. In the hole of ring 148 is mounted with most limited clearance the fillister head 38, integral with stylus rod 42 and said ring slides guided between the annular faces of two rings 52 and 53 integral with body A of the master.

Consequently, the displacements of the stylus rod 42 are transmitted immediately, and without clearance, from the small rod 146 onto the pistons 22 and 23 and said small rods behave either as tension rods or as pushers.

The transmission without clearance between stylus rod and the small pistons is moreover ensured by fixing the adjacent extremities of the small rods 146 directly to appendix 40 of stylus rod 42 thus eliminating possible clearances, which may form between head 38 and ring 148. In this latter case and considering the amplitude of the deflections of stylus rod 42, the anchoring of small rods 146 to said stylus rod may be effected by means of suitable provisions, which ensure the necessary flexibility to said small rods 146 during the displacements of the master.

With reference to FIG. 5 the shown distributor group permits equivalent angular displacement of stylus rod 42 to vary the area of openings between the chambers of said group and the pipes 152 for the feed and for discharge 154 with progressively increasing sections.

This condition is obtained by substituting the usual peripheral grooves provided on the inside of cylinder 20 with radial holes 156 and 158 controlling the communication between pressure pipe 152 and one of the two pipes 154.

The diameters of holes 156 and 158 are substantially equal to the width or thickness of the elementary pistons presented by piston 22, so that when this latter is in the position shown in FIG. 5, the communications between the chambers of the assembly X are closed, whereas when said piston moves towards the right or left side, the communication between these chambers provided by pipes 152 and one of the pipes 154 occurs.

Due to the profile presented by each of the holes 156 and 158 the passage sections between pipes 152 and 154 (equivalent with the displacements effected by piston 22) results progressively increased. More specifically, as soon as the small piston 22 is moved away from the rest position shown in FIG. 5 a limited flow of fluid occurs between pipes 152 and 154; increasing the displacement of small piston 22, the flow section between the chambers increases with increasing effect, due to the shape of the edges of the holes 156 and 158 and of the elementary pistons, which form passage openings increasing not only axially, but also transversally and along the periphery of the piston. Thus it is possible to obtain corresponding displacements between the tool and the workpiece, varying with the desired characteristics. More particularly, it is possible to feed the apparatus controlled by the master with high pressure without vibrations or other inconvenients occuring, ensuring to the master on the other side the possibility of reproducing very small reliefs.

Naturally the transverse section of the holes 156 and 158 may be most opportune in consideration of the aims to be reached. Obviously, said holes may be provided along the whole diameter of cylinder 20 and in variable numbers.

The modifications considered above may be applied with equal benefit also on the usual types of hydraulic masters for reproducing exactly the profile of the template of the workpiece.

The principles of transmission between rod 42 and the distributors of the master, which have been described and illustrated, makes it possible to obtain a substantially unitary transmission ratio, with respect to the displacements X, Y and Z of stylus K and the corresponding displacements by distributor valves 22, 23 and 126. In case the stylus must be replaced by another one considering the work to be effected, this ratio practically in not varied, provided that the length of the two portions determined by the sphere 68 and the ends of rod 42 are not considerably modified.

The elementary distributor assemblies X, Y and Z are all mounted in body A, and seats 10, 12 and 14 for said groups are identical, thus facilitating the substitution of said groups.

The distributor pistons 22 and 23 of the horizontal assemblies X and Y are connected with rod 42 through bilateral constraints either of brackets 34 and 35 (FIG. 1 to 4) or of rods 146 (FIG. 5), which do away with the need to employ of spring means. Thus it is possible to reduce the load acting upon the stylus, which is practically equal for all displacements effected by said rod. The control of stylus K, which is effected manually, makes it possible to impart to the workpiece slow and rapid displacements, with respect to the tool in one or more of the directions X, Y and Z. This control occurs with reduced or increased effort exercised on stylus K.

The master described and illustrated may be modified and varied, for example, rod 42 may be slidingly retained by tubular element 106, also by means of a membrane consisting of plates or other flexible members, constrained with their ends to the double tubular elements and to the tubular body. This remains within the limits of the present invention and therefore within the dominion of the patent of invention.

I claim:

1. A hydraulic tracer for milling machines, said tracer having a housing containing two spool valve assemblies mounted for reciprocating motion at right angles to each other, a movable stylus mounted in said housing, the axis of said stylus being normally orthogonal to the axis of each said spool valve assembly, said stylus being axially movable relative to said housing and being rockable in all angular directions about a pivot point intermediate its ends and bearingly coupled to said spool assemblies to thereby impart reciprocating motion to said spool assemblies responsive to rocking movement of said stylus, a third spool valve assembly the axis of which is orthogonal to the axes of said first two spool assemblies, and parallel to the axis of said stylus, means to impart axial movement of said stylus to said third spool assembly.

2. The hydraulic tracer of claim 1 wherein said means includes an arm bearingly engaging said third spool valve assembly, said arm provided with a slot through which a pin extends, said pin mounted on said housing aligning the arm relative to the stylus axis.

3. The hydraulic tracer of claim 2 wherein said arm is carried by a sleeve, said sleeve carrying said stylus pivot.

4. The hydraulic tracer of claim 1 wherein said stylus is carried by its pivot, said pivot carried by a sleeve which is slidable within said housing, said sleeve coupled to said housing by a spring-urged ball, one portion of said ball positioned in an annular groove in the outer surface of said sleeve and the other portion of said ball supported by said housing, said ball normally maintaining said stylus in a fixed axial position with respect to said housing.

5. The hydraulic tracer of claim 4 including an antifriction sleeve interposed between said first mentioned sleeve and said housing and whose antifriction elements contact said first mentioned sleeve and said housing, said antifriction sleeve having an opening to pass said ball, said antifriction sleeve being resiliently biased in opposite axial directions.

6. The hydraulic tracer of claim 4 including means to vary the force of said ball by the spring associated with it.

7. The hydraulic tracer of claim 1 wherein the spools of said first two spool valve assemblies are hollow, said stylus carrying an annular enlargement which is in contact with the interior of an annulus, a flexible rod running the length of each said spools, each rod clamped at one end to said annulus and at its other end to a portion of its corresponding spool, whereby motion of the stylus is transmitted to the spools by the flexible rods.

8. The hydraulic tracer of claim 1 including a rounded enlargement at the upper end of said stylus which bearingly engages the interior of a bushing, said bushing being resiliently constrained by a resiliently urged ball to occupy a quiescent position.

9. The hydraulic tracer of claim 1 wherein the spool assemblies each include a spool having land portions axially spaced therealong, each spool slidable within a cylinder having radially directed holes therein, said holes communicating with flow passageways in said housing, each spool having a normal position, the radial holes axially coincident with the lands each having a diameter equal to the axial extent of its corresponding land.